(12) United States Patent
Kano

(10) Patent No.: US 7,082,447 B2
(45) Date of Patent: Jul. 25, 2006

(54) METHOD AND APPARATUS FOR ARCHIVE DATA VALIDATION IN AN ARCHIVE SYSTEM

(75) Inventor: Yoshiki Kano, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 22 days.

(21) Appl. No.: 10/867,657

(22) Filed: Jun. 16, 2004

(65) Prior Publication Data

US 2005/0283594 A1 Dec. 22, 2005

(51) Int. Cl.
*G06F 17/30* (2006.01)
(52) U.S. Cl. .................. 707/204; 707/3; 707/10; 707/102; 707/104.1; 707/203; 713/202; 713/300
(58) Field of Classification Search .............. 707/10, 707/102, 104, 203, 204, 3, 6, 104.1; 714/54, 714/42, 718; 710/56; 713/300, 200, 168, 713/202; 717/2, 170; 235/376, 380; 709/234; 455/41.2; 382/181
See application file for complete search history.

(56) References Cited

U.S. PATENT DOCUMENTS

| | | | |
|---|---|---|---|
| 5,590,272 A | 12/1996 | Murata et al. ................. 717/2 |
| 5,592,618 A | 1/1997 | Micka et al. ................. 714/54 |
| 5,771,292 A | 6/1998 | Zunquan ..................... 713/176 |
| 5,822,513 A | 10/1998 | Ofer et al. .................... 714/42 |
| 5,978,842 A * | 11/1999 | Noble et al. ................. 709/218 |
| 6,038,676 A | 3/2000 | Yanes et al. ................... 714/1 |
| 6,167,516 A | 12/2000 | Camion et al. ............. 713/168 |
| 6,629,273 B1 | 9/2003 | Patterson .................... 714/718 |
| 6,694,459 B1 | 2/2004 | Nyman ....................... 714/718 |
| 6,895,501 B1 * | 5/2005 | Salowey .................... 713/168 |
| 6,952,823 B1 * | 10/2005 | Kryloff et al. ............. 717/170 |
| 2002/0195488 A1 * | 12/2002 | Walsh ........................ 235/380 |
| 2003/0018802 A1 * | 1/2003 | Romanik et al. ........... 709/234 |
| 2003/0150909 A1 * | 8/2003 | Markham et al. .......... 235/376 |
| 2003/0188058 A1 | 10/2003 | Ohashi et al. ................ 710/56 |
| 2003/0204755 A1 * | 10/2003 | Morris ........................ 713/300 |
| 2003/0236851 A1 | 12/2003 | Cuddihy et al. ............ 709/214 |
| 2004/0025060 A1 * | 2/2004 | Raffaele et al. ............. 713/202 |

(Continued)

FOREIGN PATENT DOCUMENTS

EP 0 940 945 A2 9/1999

(Continued)

OTHER PUBLICATIONS

Wong et al., "Verifiable Secret Redistribution for Archive Systems", IEEE, May 2003, pp. 1-12.*

(Continued)

*Primary Examiner*—Thuy N. Pardo
(74) *Attorney, Agent, or Firm*—Mattingly, Stanger, Malur & Brundidge, P.C.

(57) ABSTRACT

A method and apparatus for validation of archived data that includes one or more servers or data sources, an archive server, and one or more storage subsystems. Data is received from the data source and a verification code is generated on the data using a verification method. The data, and the verification information, including the verification code, and the verification method, are sent to the storage subsystem and stored. A request for verification of the data stored at the storage subsystem is received. A second verification code on the stored data at the storage subsystem is generated at the storage subsystem using the stored verification method. The verification code and the second verification code are compared and either a data verified signal or a data not verified signal is sent by the storage subsystem based on the comparison in response to the request.

22 Claims, 7 Drawing Sheets

U.S. PATENT DOCUMENTS

2005/0020212 A1* 1/2005 Hiramitsu et al. .......... 455/41.2
2005/0185841 A1* 8/2005 Tyan et al. ................. 382/181
2005/0216794 A1* 9/2005 Yagawa ....................... 714/42

FOREIGN PATENT DOCUMENTS

EP      1 246 050 A2    2/2002

OTHER PUBLICATIONS

R. Rivest, "The MD5 Message-Digest Algorithm", Network Working Group Request for Comments: 1321; MIT Laboratory for Computer Science and RSA Data Security, Inc., Apr. 1992.

* cited by examiner

| LDEV_LUM | Parity Group | Offset on Parity Group | Size of LDEV |
|---|---|---|---|
| 1 | 1 | 0 | 1GB |
| 2 | 1 | 1073741824 | 1GB |
| 3 | 2 | 2147483648 | 1GB |
| ... | ... | | ... |

FIG 3

| VID | Format | Physical ID(LDEV) | Offset | Size | Verication_Method | Verification_Code |
|---|---|---|---|---|---|---|
| 1 | UDF | 1 | 0 | 1000000 | Checksum | 8B |
| 2 | ISO9660 | 2 | | | MD5 | 60b725f10c9c85c70d97880dfe8191b3 |
| ... | ... | ... | ... | ... | ... | ... |

FIG 7

| Port | WWN | LUN | LDEV |
|---|---|---|---|
| 1 | 10.00.00.00.C9.36.07.D7 | 1 | 1 |
| 1 | 10.00.00.00.C9.36.07.D7 | 2 | 2 |
| 1 | 10.00.00.00.C9.36.07.D7 | 3 | 3 |
|  |  |  |  |
| 2 | 10.00.00.00.C9.36.07.01 | 1 | 10 |
| 2 | 10.00.00.00.C9.36.07.01 | 2 | 11 |
| 2 | 10.00.00.00.C9.36.07.01 | 3 | 12 |
| 2 | 10.00.00.00.C9.36.07.01 | 4 | 13 |
|  |  |  |  |
| I | XX.XX.XX.XX.XX.XX.XX.XX | J | L |

FIG 4

| LDEV_NUM | Offset | Size | Verify_Method | Verification_Code | ID |
|---|---|---|---|---|---|
| 1 | 0 | 1000000 | CHECK_SUM | 8B | 1 |
| 2 |  | 4GB | MD5 | 60b725f10c9c85c70d97880dfe8191b3 | 2 |
| ... | ... | ... | ... | ... | ... |

FIG 5

METHOD AND APPARATUS FOR ARCHIVE DATA VALIDATION IN AN ARCHIVE SYSTEM

BACKGROUND

1. Field of the Invention

This invention relates to storage subsystems, and more specifically to validation of archived data at storage subsystems.

2. Description of the Related Art

The storage of data has always been important in data systems and enterprises and businesses. During the normal course of business, many companies generate massive amounts of information and data, much of which must be stored. Many times, this data must not only be stored, but must be stored and maintained for extended periods of time. Therefore, data such as this is usually archived in storage for possible retrieval at a later date. Archived data is generally stored on a backup disk(s) or storage device(s), and not on what may be considered as a primary disk(s) or storage device(s).

Archiving large amounts of data requires large amounts of storage and, therefore, the storage requirements can be costly. However, disk bit cost for storage devices such as ATA disk have currently become similar to that of tape or optical medium bit cost. Thus, many companies and vendors are considering using current disk subsystems as archived storage subsystems. However, disk subsystems that have been used as a primary storage or disk, many times lacks the capabilities desired for an archive storage subsystem. Over time, it is possible that some corruption or errors may have occurred on some or all of the archived data. Therefore, since data may have been stored for an extended period of time, upon retrieval of this archived data, validation or verification as to the correctness of the data may be desired. This process is currently performed by servers, which are connected to the storage subsystem. In systems where data is constantly archived by a server onto a storage subsystem, as the data archived increases year by year, an archive server will have to spend a lot of time to verify or validate the correctness of retrieved data.

Currently, many systems use redundant arrays of inexpensive disks (RAID) storage subsystems for data validation. RAID systems may be able to detect the corruption of data, but currently RAID systems perform validation of data using a server connected to the RAID storage subsystem. Data validation occurs at the server after the data is read from the storage subsystem. However, data verification of data on a storage subsystem at a server is problematic in that this requires a heavy overhead of substantial I/O between the server and the storage subsystem to verify all the data. Moreover, the server must perform many calculations to ensure validation of the data. This can have a negative effect on other archived data retrieving tasks.

SUMMARY OF THE INVENTION

A method and apparatus for validation of archived data that includes one or more servers or data sources, an archive server, and one or more storage subsystems. Data is received from the data source and a verification code is generated on the data using a verification method. The data, and the verification information, including the verification code and the verification method, are sent to the storage subsystem and stored. A request for verification of the data stored at the storage subsystem is received. A second verification code on the stored data at the storage subsystem is generated at the storage subsystem using the stored verification method. The verification code and the second verification code are compared and either a data verified signal or a data not verified signal is sent by the storage subsystem based on the comparison in response to the request.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3 is a diagram of a configuration table according to an example embodiment of the present invention;

FIG. 4 is a diagram of a configuration table mapping logical device to logical unit on a port, according to an example embodiment of the present invention;

FIG. 5 is a diagram of archive and verification information stored according to an example embodiment of the present invention;

FIG. 7 is a diagram of information in a media index table according to an example embodiment of the present invention;

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The embodiments of the present invention provide methods and apparatus that offload data validation from an archive server and more efficiently place the verification task in a data storage subsystem. To illustrate the present invention embodiments will be used where an archive server may include archive software and a storage API (application program interface) that controls the storage subsystem. The storage API at the archive server may request verification of target data to the storage subsystem. The storage subsystem may then verify the data and return a status as to whether the data was verified or not verified to the archive server. Verification of the data at the storage subsystem includes computing a verification code on the retrieved data using a stored verification method received from the archive server and comparing the computed verification code with a verification code received from the archive server. Data may be verified using any of many types of data verification methods including but not limited to, hash functions, parity checking, check sums, compression algorithms, etc.

Figure 1:
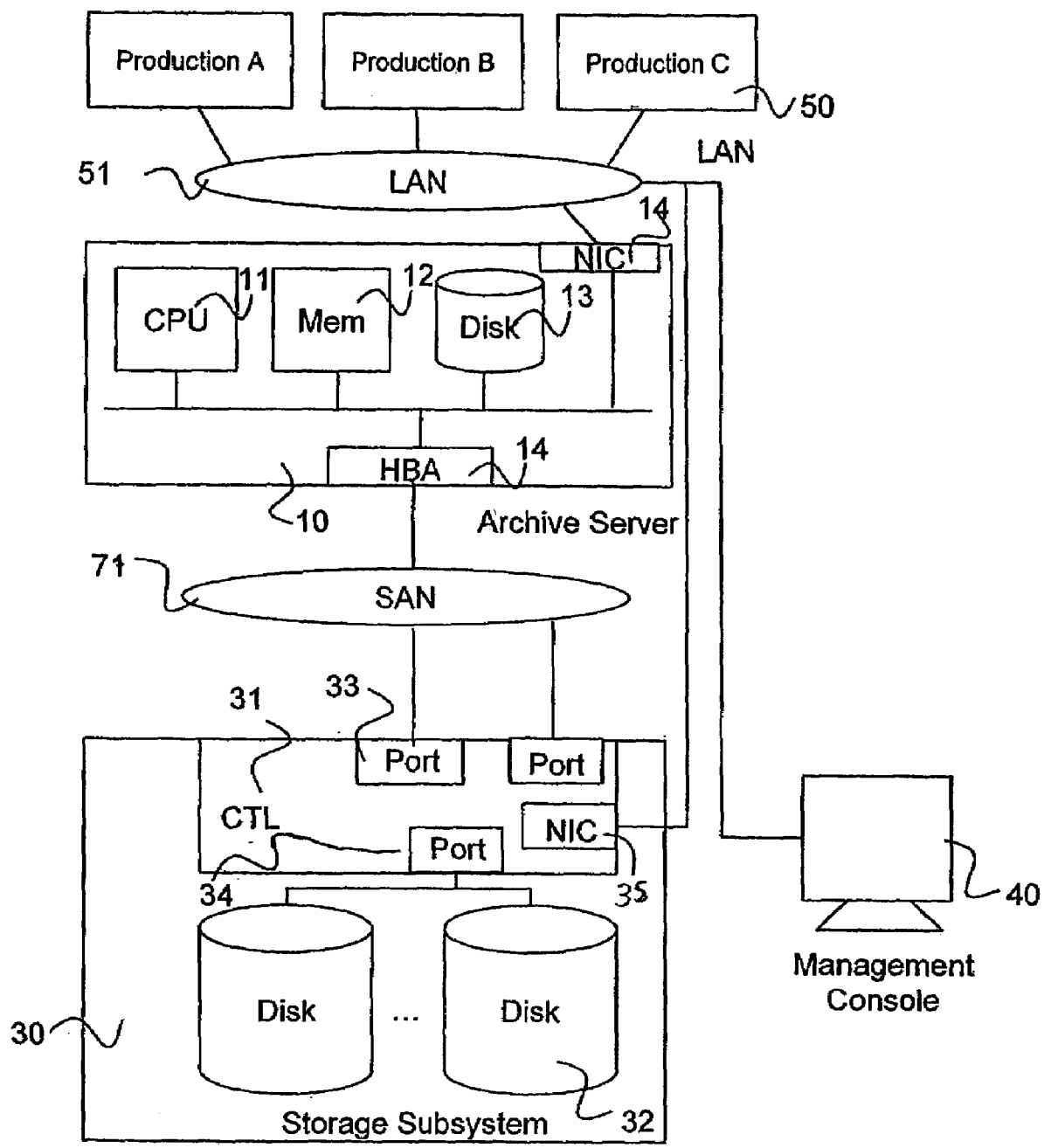
FIG. 1 is a diagram of a system for archiving and validation of data according to an example embodiment of the present invention.

FIG. 1 shows diagram of a system for archiving and validation of data according to an example embodiment of the present invention. An archive server 10 may be interconnected to one or more servers 50 via a local area network (LAN) 51, and connected to a storage subsystem 30 via a storage area network (SAN) 71. Each production server 50 may be any type of server or other device that contains data that may need to be archived or stored for an extended period of time. For example, the production server 50 may include any type device with data such as, for example, a storage device, a database, an e-mail server, database server, medical records server, financial data server, etc. Each production server may include elements common in server and computing device architectures, such as for example, a CPU, memory, network interface card (NIC), and storage to execute and run an operating system and one or more applications.

Similarly, an archive server 10 may serve as a data retrieval host device, and include a CPU 11, memory 12, and disk(s) 13 to run an operating system and archive software. Further, the archive server 10 may include a NIC 14 to interface with a LAN 51, and a host bus adapter interface (HBA) 14 to interface with a SAN 71.

The storage subsystem 30 may include one or more ports 33 allowing interface to a SAN 71. Further, the storage subsystem 30 may include a controller 31, one or more disks 32, one or more ports interfacing the controller with the disks, and a NIC 35 that may interface the storage subsystem 30 to a LAN 51.

The network 51 and the network 71 may be any type of network that provides adequate interfacing between servers and storage subsystems and may be, for example, a Fibre Channel, an Ethernet, a token-ring, a small computer system interface (SCSI) bus, etc. SCSI I/O operations may be used to transfer data to and from the storage subsystem. The one or more disks 32 may consist of a RAID configuration. The controller 31 may be a processor that includes non-volatile random access memory (NVRAM). The NVRAM allows storage of data for protection against unforeseen events, for example, from a power failure. The ports 33 of the controller 31 may include a worldwide name (WWN) to specify a target ID that may consist of a logical unit number on a Fibre Channel port.

The storage subsystem 30 may also include a control console 40 connected to the storage subsystem 30 either directly or via a LAN 51 like an Ethernet, token-ring, or other communication, to allow for management of the storage subsystem 30. Management may include the creation of parity groups, the creation of logical devices, or the connection of logical devices to logical units.

Figure 2:
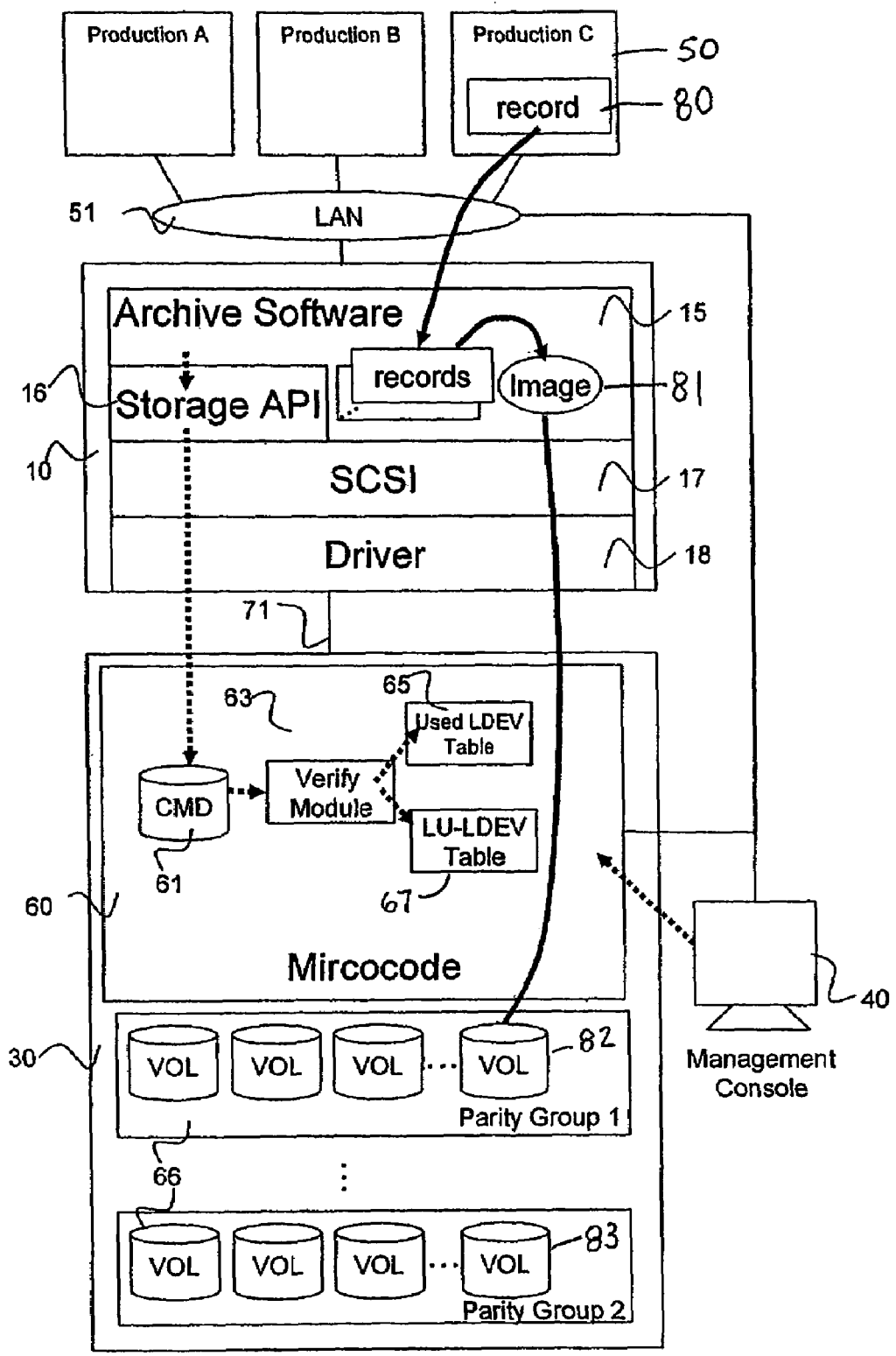
FIG. 2 is a diagram of a system for validation of archived data including example software components, according to an example embodiment of the present invention.

FIG. 2 shows a diagram of a system for validation of archived data including example software components, according to an example embodiment of the present invention. In this diagram, a solid line is used to indicate the direction of a data access, while a dashed line indicates the direction of control information. The archive server 10 may include archive software 15 that may include a storage API 16, a SCSI 17, and a driver 18 that interfaces to the storage subsystem 30.

The archive software 15 may retrieve or receive data to be archived 80 from one or more servers 50. The data to be archived may be in any of various forms, for example, records, files, e-mail, etc.

The archive software 15 may store the data 80 from the server 50 to a logical device at storage subsystem 30 via a logical unit. Storage subsystem 30 may include one or more storage units 82, 83 that may be configured in a RAID configuration of one or more parity groups 66. Further, the storage units 82, 83 may be in the form of a logical storage unit or a physical storage unit. In this regard, an archive server or other device may interface with storage subsystem 30 to access storage whereby storage subsystem 30 provides a logical unit that may emulate one or more physical storage units. To servers and host devices, the logical unit may appear to be the same as physical storage.

The storage subsystem 30 may also include a verify module 63, used logical device table 65, and logical unit-logical device table 67. The controller 61, verify module 63, used logical device table 65 and logical unit-logical device table 67 may all be implemented in microcode residing at storage subsystem 30. The microcode may also include a module for creation of parity groups. The used logical device table module 65 may be used for creation of logical devices. Further, the logical unit-logical device table module 67 may be used for creation of logical units. The verify module 63 may work with the controller 61 and the storage API 16 in the archive software 10 to perform verification operations that will be discussed following.

A command module 61, which may appear as a logical unit, may receive a request regarding data of a SCSI read/write from the storage API 16, and dispatch the request to each of the other microcode modules 63, 65, 67. The command module may be implemented as a logical unit operatively connected to the logical devices of storage subsystem 30 via microcode. A module for creation of parity may also exist (although not shown in the figure), and be part of the microcode and consist of a parity group from disks using RAID 0/1/2/3/4/5 technology, or other storage technology.

A module for creation of logical devices may also exist (although not shown), and may be implemented in microcode and allow creation of several logical devices. Each logical device may be defined a size on a parity group 66. The size of a logical device may be either fixed or of variable size, defined by an administrator via the management console 40. The definitions defined by an administrator may be stored as a configuration table.

FIG. 3 shows a diagram of a configuration table according to an example embodiment of the present invention. An administrator or user at a management console 40 may configure logical devices at the storage subsystem 30 by defining a logical device number 301 and associated parity group 302, offset on parity group 303 and size of logical device 304. In this example embodiment, three logical devices have been defined, two in parity group one and one in parity group two. In this example embodiment, the size of each logical device is 1 GB (gigabyte). When an administrator creates a logical device on a parity group, the logical device number 301 identifies the logical device in the system. The information in the configuration table, once completed, may then be stored.

FIG. 4 shows a diagram of a configuration table mapping logical device to logical unit on a port, according to an example embodiment of the present invention. When a logical device is defined, a logical unit on a port (e.g., Fibre Channel port) to present the logical device to a host may be defined. A Fibre Channel port, for example, may have 256 logical units in the case of a host adapter configuration. A mapping of each logical device to a logical unit on a port may be assigned.

A configuration table mapping logical device to logical unit on a port may include a port number 501, a World Wide Name (WWN) 502, a logical unit number (LUN) 503 and a logical device (LDEV) number 504. Each port number may have an associated WWN that is seen from a host or server's host bus adapter to identify the port. If a host or server desires access to a logical device, the host bus adapter (HBA) may look up the WWN to identify the port so that the SCSI may identify the associated logical unit number. Upon access of a host or server to a logical device at a storage subsystem, microcode at the storage subsystem may redirect the logical device in order to access the data desired. The logical unit to logical device configuration mapping may be stored in the NVRAM cache on the storage subsystem.

Microcode 60 residing at a storage subsystem 30 may also include a SCSI I/O operation module (not shown) that process general SCSI-2, 3 operations, like Read 6/Write 6, for a sequential disk device. The SCSI I/O operation module may perform all types of SCSI commands.

An archive software 15 upon receiving data to be archived, calculates a verification code on the data. The verification code may be determined on each individual piece of data, file or record, or an image of all data, records, files, etc. may be created and the verification code created on the image. The verification code may be calculated by any of many known data verification means, such as for example, parity, check sums, hash codes (e.g., MD5), etc. The archive software 15 may then store the verification code and verification method.

FIG. 5 shows a diagram of archive and verification information stored according to an example embodiment of the present invention. The archive software 15 at the archive server 10 may set a region of data at the storage subsystem 30 for archive purposes. A logical device number 101 is a unique identifier for the logical device in the storage subsystem. The offset 102 and a size 108 represent a region of data on the logical device. The verify method 103 specifies the method used to verify the data, and a verification code 104 defines a code or value that is the result of the verification method being applied to the data. The region may also be given an ID 105 for identification purposes that may identify the offset and size of the region.

Thus, an archive server 10 may calculate a verification code on data to be archived using a verification method, and then send the data and the verification information, including the verified method and verification code, to the storage subsystem 30 to be stored. The verification information may or may not be stored locally at the archive server. The data and verification information may remain stored at the storage subsystem 30 until an archive server 10 desires verification/validation of the stored archived data or retrieval of the data. If the archive server desires access to or validation of the data, the archive software 15 may request a function call to the storage subsystem 30. If this occurs, the storage subsystem 30 may access a verification table containing the archive and verification information stored in FIG. 5, and return the ID 105 defined as a unique number in the storage subsystem 30. The ID 105, as noted previously, may be used to represent a logical device number 101 and associated offset number 102, for example.

A verify data function may be called by the archive server 10 when a verification/validation of stored data is desired. A verify module 63 at storage subsystem 30 may perform the verification of the logical device based on the indicated logical device number 101, the offset for the data 102, the size of the data 108, the verify method 103 and the verify code 104.

Figure 6:
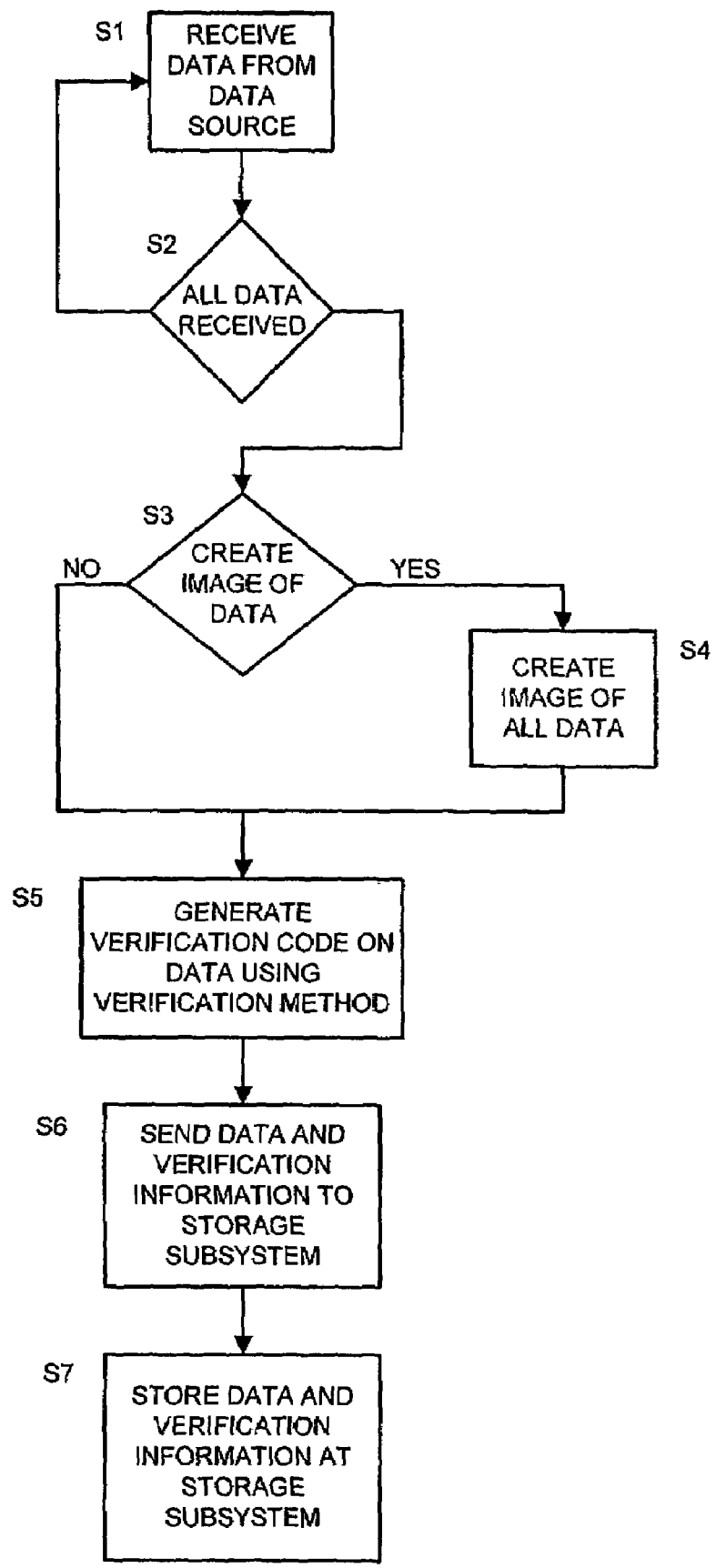
FIG. 6 is a flowchart of a process for retrieving data to be archived according to an example embodiment of the present invention.

FIG. 6 shows a flowchart of a process for retrieving data to be archived according to an example embodiment of the present invention. Data to be archived may be received from a data source S1. For example, archive software 15 at archive server 10 may collect archive records from one or more applications on one or more servers 50. A determination is made as to whether all data to be archived has been received S2, and if not, the next data is received/retrieved S1. Data may be received for a specified timeframe for example, for a full day, or until a specified size of storage has been reached based on the accumulated received data. If all data has been received S2, a decision is made as to whether an image of the received data is to be created S3. The archive software 15 may create a single file image of all data and store the image of the data on the logical unit at the storage subsystem 30. An image of the received data may be desired for easier sending and storing at the storage subsystem, or if the amount of data is large. Creating an image may make it easier to generate a verification code using a specific verification method.

If an image of the data is desired, an image may be created of all the received data S4. An archive server may then generate a verification code on the data or image using a verification method S5. The data and verification information, including the verification code and verification method, may then be sent to the storage subsystem S6. The data and verification information may then be stored at the storage subsystem S7. The verification information may also be stored at the archive server in the form of a media index table.

FIG. 7 shows a diagram of information in a media index table according to an example embodiment of the present invention. A media index table may include an internal volume ID 401, a media format for the image of the data or records 402, a physical ID (logical device) 403, an offset value showing a start of the logical block address (LBA) where the data or image is stored 404, a size of the data or image 405, the verification method used on the data or image 406, and the resultant verification code based on applying the verification method to the data or image 407. In this example embodiment, two volume IDs exist, one in a universal disk format (UDF) and another in an ISO9660 format, which is the CD-R format for compact disks. As noted in this example, the data or image associated with volume ID 1 has had a verification method of generating a check sum operation performed on it and is in a UDF format. The result of the check sum operation has resulted in a verification code value of 8B. Also, the data associated with volume ID 2 has had an MD5 hash function operation performed on it resulting in the long verification code shown, and is in an ISO9660 format.

Figure 8:
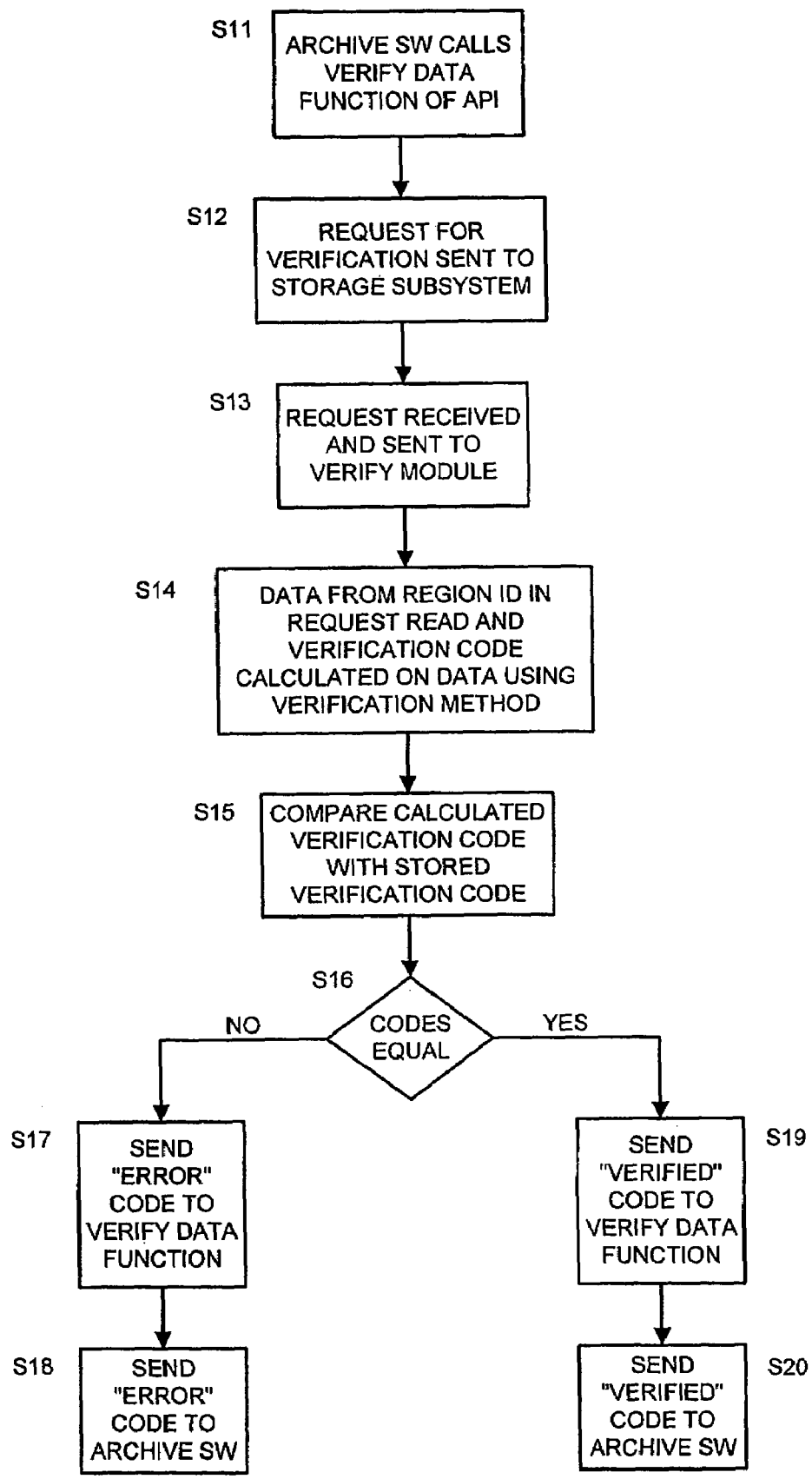
FIG. 8 is a flowchart of a process for verification of stored data according to an example embodiment of the present invention.

FIG. 8 shows a flowchart of a process for verification of stored data according to an example embodiment of the present invention. Archive software at an archive server may call a verify data function of an application program interface (API) S11. A request for verification may then be sent to the storage subsystem S12. In this regard, the storage API may send the request to a command module at the storage subsystem. The request is received at the storage subsystem and may be sent to a verify module S13. The verify module may then look up the region of storage identified by the ID in the request. Data from the region ID in the request may then be read and a verification code calculated on the stored data using the stored verification method S14. The region for the ID may be defined or stored on the used logical device table at the storage subsystem. The verification method used is the method previously stored at the storage subsystem and associated with the region ID. A comparison may be made between the calculated verification code and the stored verification code S15. A determination is made as to whether the codes are equal S16, and if not an "error" code may be sent to the verify data function or module at the storage subsystem S17. The "error" code may be a message or may be a simple value such as "−1". The verify module may then send the "error" code to the archive software at the archive server S18. If the codes are equal S16, a "verified" code may be sent to the verify data function module S19. The verify data module then may send the "verified" code to the archive software at the archive server.

Figure 9:
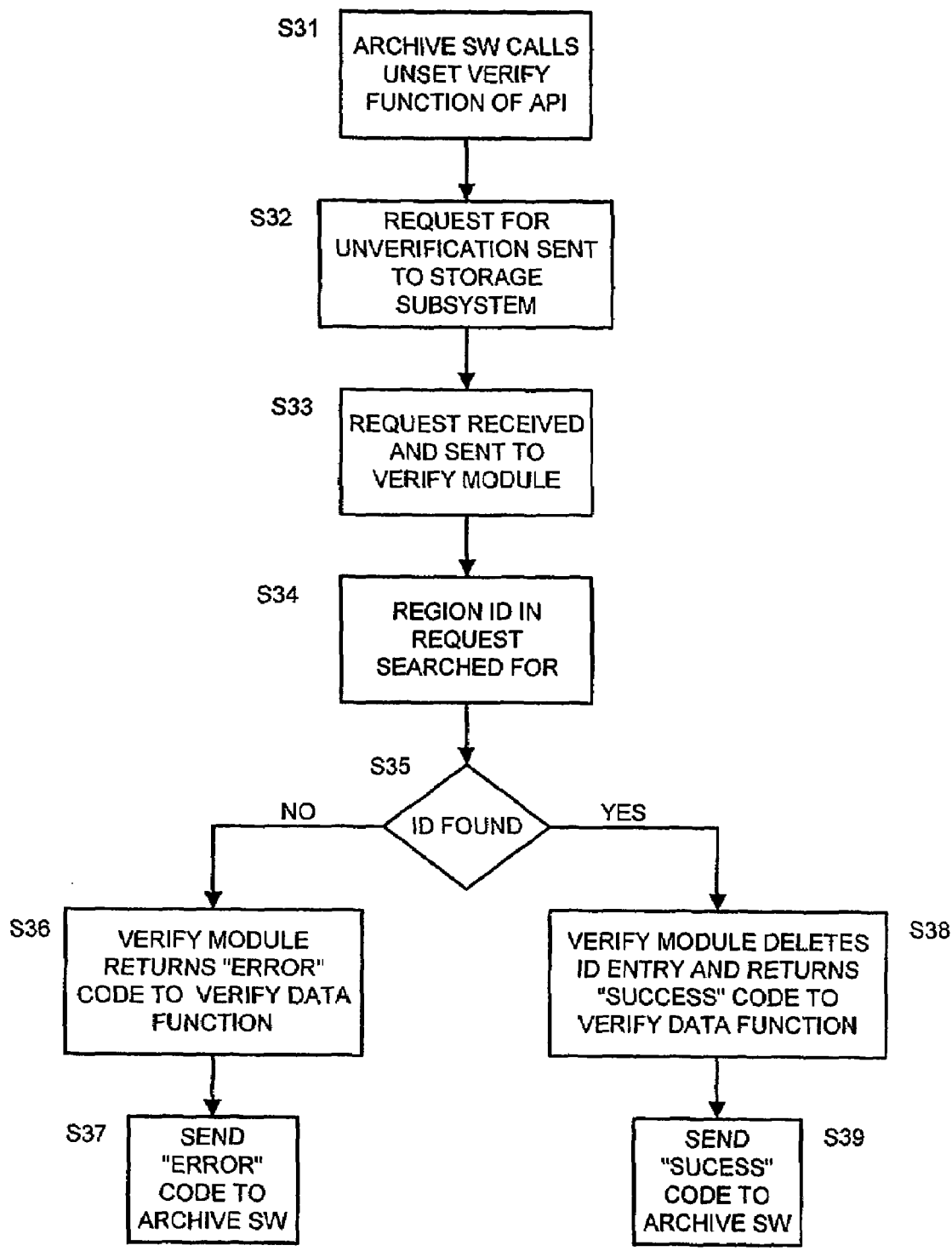
FIG. 9 is a flowchart of a process to unset verification on a region of storage according to an example embodiment of the present invention.

FIG. 9 shows a flowchart of a process to unset verification on a region of storage according to an example embodiment of the present invention. At some point it may be desired not to verify previously stored archived data. In this situation, the verification information stored at the storage subsystem associated with a particular ID or region of storage may be deleted such that any future access to this region of storage may simply cause the stored data to be read out without verification.

If an unset of the verification is desired, the archive software may call an unset verify function of an API at the archive server S31. The request for un-verification may be sent to a command module at the storage subsystem S32. The request may be received by the command module in microcode and then sent to the verify module in microcode S33. The verify module may then look up the region ID, identified in the request, in a used logical device table S34. A determination is made as to whether the region ID has been found S35, and if not, the verify module may return an "error" code to the verify module S36. The verify module may then forward the "error" code to the archive software on the archive server S37. If the ID is found S35, the verify module may delete the ID entry, and possibly the associated verification information, and return a "success" code to the verify data function or module S38. The verify data module may then send the "success" code to the archive software at the archive server S39.

Embodiments for methods and apparatus for validation of archive data according to the present invention are advantageous in that a host processor or server is no longer burdened with the task of archived data verification. This reduces the amount of I/O between a server or host and a storage subsystem for verifying data. This results in an increase in system performance.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for validation of archived data comprising:
receiving data from a data source;
generating a verification code on the data using a verification method;
sending the data and verification information to a storage subsystem,
the verification information including the verification code and the verification method;
storing the verification information and the data at the storage subsystem;
receiving a request for verification of the data stored at the storage subsystem;
generating a second verification code on the stored data at the storage subsystem using the verification method;
comparing the verification code and the second verification code;
sending one of a data verified signal and a data not verified signal by the storage subsystem in response to the request based on the comparison,
generating an image of the data and generating the verification code on the image of the data using the verification method, and
controlling the storage subsystem by a storage Application Program Interface (API) at a server,
wherein the storage API comprises a function that performs initiating verification of a region of storage at the storage subsystem.

2. The method according to claim 1, wherein the data source comprises one of a server, a network device, and a data input device.

3. The method according to claim 1, wherein the data received from the data source is received at a server, the generating the verification code on the data, and sending the data and verification information to a storage subsystem being performed by the server.

4. The method according to claim 1, wherein the data verification method comprises one of generating checksum, generating parity, and performing a hash function on the data.

5. The method according to claim 4, wherein the hash function is a MD5 hash.

6. The method according to claim 1, wherein the initiating verification of a region of storage at the storage subsystem comprises using an associated identification for the region.

7. The method according to claim 1, wherein the storage API controls the storage subsystem using SCSI command sets.

8. The method according to claim 1, wherein the received data comprises one of a single file and a plurality of files.

9. The method according to claim 1, wherein the request for verification includes an ID of a region in the storage subsystem associated with the stored data.

10. The method according to claim 1, further comprising requesting a region of a logical storage device at the storage subsystem to store the data before the sending the data and verification information to the storage subsystem.

11. The method according to claim 10, further comprising receiving a unique ID for a region of a logical storage device at the storage subsystem in response to the requesting a region of a logical storage device at the storage subsystem.

12. A method for validation of archived data comprising:
receiving data from a data source;
generating a verification code on the data using a verification method;
sending the data and verification information to a storage subsystem, the verification information including the verification code and the verification method;
storing the verification information and the data at the storage subsystem;
receiving a request for verification of the data stored at the storage subsystem;
generating a second verification code on the stored data at the storage subsystem using the verification method;
comparing the verification code and the second verification code; and
ending one of a data verified signal and a data not verified signal by the storage subsystem in response to the request based on the comparison,
wherein the storing the verification information and the data at the storage subsystem, the receiving the request for verification of the data stored at the storage subsystem, the generating the second verification code on the stored data at the storage subsystem, the comparing the verification code and the second verification code; and the sending the one of the data verified signal and the data not verified signal in response to the request are performed by microcode executing at the storage subsystem.

13. A method for validation of archived data comprising:
receiving data from a data source;
generating a verification code on the data using a verification method;
sending the data and verification information to a storage subsystem, the verification information including the verification code and the verification method;
storing the verification information and the data at the storage subsystem;
receiving a request for verification of the data stored at the storage subsystem;
generating a second verification code on the stored data at the storage subsystem using the verification method;
comparing the verification code and the second verification code;
ending one of a data verified signal and a data not verified signal by the storage subsystem in response to the request based on the comparison, and
further comprising controlling the storage subsystem by a storage Application Program Interface (API) at a server,
wherein the storage API comprises a function that performs at least one of setting a region of storage at the storage subsystem for verification and setting an associated identification, setting the verification method, and generating the verification code.

14. A for validation of archived data comprising:
receiving data from a data source;
generating a verification code on the data using a verification method;
sending the data and verification information to a storage subsystem,
the verification information including the verification code and the verification method;
storing the verification information and the data at the storage subsystem;
receiving a request for verification of the data stored at the storage subsystem;
generating a second verification code on the stored data at the storage subsystem using the verification method;
comparing the verification code and the second verification code;
sending one of a data verified signal and a data not verified signal by the storage subsystem in response to the request based on the comparison,
generating an image of the data and generating the verification code on the image of the data using the verification method, and
controlling the storage subsystem by a storage Application Program Interface (API) at a server,
wherein the storage API comprises a function that performs canceling a region of storage at the storage subsystem set for verification.

15. The method according to claim 14, wherein the canceling a region of storage at the storage subsystem set for verification is based on an associated identification for the region.

16. A system for archiving and validation of data comprising:
at least one server, each at least one server operatively connected to a first network and containing data to be archived;
an archive server, the archive server operatively connected to the first network and a second network, the archive server receiving the data from the at least one server and generating a verification code on the data using a verification method; and
a storage subsystem, the storage subsystem operatively connected to the second network and including a controller and at least one storage unit, the storage subsystem receiving and storing the data and verification information from the archive server, the verification information including the verification code and the verification method, the storage subsystem capable of generating a second verification code on the stored data at the storage subsystem using the verification method and comparing the verification code with the second verification code and sending one of a data verified signal and a data not verified signal to the archive server in response to receiving a request for verification from the archive server of the data stored at the storage subsystem, wherein the archive server further comprises an archive module, the archive module including a storage Application Program Interface (API), the API controlling the storage subsystem, and wherein the storage API comprises a function that performs at least one of setting a region of storage at the storage subsystem for verification and setting an associated identification, setting the verification method, and generating the verification code.

17. A system for archiving and validation of data comprising:

at least one server, each at least one server operatively connected to a first network and containing data to be archived;

an archive server, the archive server operatively connected to the first network and a second network, the archive server receiving the data from the at least one server and generating a verification code on the data using a verification method; and a storage subsystem, the storage subsystem operatively connected to the second network and including a controller and at least one storage unit, the storage subsystem receiving and storing the data and verification information from the archive server, the verification information including the verification code and the verification method, the storage subsystem capable of generating a second verification code on the stored data at the storage subsystem using the verification method and comparing the verification code with the second verification code and sending one of a data verified signal and a data not verified signal to the archive server in response to receiving a request for verification from the archive server of the data stored at the storage subsystem, wherein the archive server further comprises an archive module, the archive module including a storage Application Program Interface (API), the API controlling the storage subsystem, wherein the archive server further comprises an archive module, the archive module including a storage Application Program Interface (API), the API controlling the storage subsystem wherein the storage API comprises a function that performs initiating verification of a region of storage at the storage subsystem.

18. The system according to claim 17, wherein the initiating verification of a region of storage at the storage subsystem comprises using an associated identification for the region.

19. A system for archiving and validation of data comprising:

at least one server, each at least one server operatively connected to a first network and containing data to be archived;

an archive server, the archive server operatively connected to the first network and a second network, the archive server receiving the data from the at least one server and generating a verification code on the data using a verification method; and a storage subsystem, the storage subsystem operatively connected to the second network and including a controller and at least one storage unit, the storage subsystem receiving and storing the data and verification information from the archive server, the verification information including the verification code and the verification method, the storage subsystem capable of generating a second verification code on the stored data at the storage subsystem using the verification method and comparing the verification code with the second verification code and sending one of a data verified signal and a data not verified signal to the archive server in response to receiving a request for verification from the archive server of the data stored at the storage subsystem, wherein the archive server further comprises an archive module, the archive module including a storage Application Program Interface (API), the API controlling the storage subsystem, and wherein the storage API comprises a function that performs canceling a region of storage at the storage subsystem set for verification.

20. The system according to claim 19, wherein the canceling a region of storage at the storage subsystem set for verification is based on an associated identification for the region.

21. A system for archiving and validation of data comprising:

at least one server, each at least one server operatively connected to a first network and containing data to be archived;

an archive server, the archive server operatively connected to the first network and a second network, the archive server receiving the data from the at least one server and generating a verification code on the data using a verification method; and a storage subsystem, the storage subsystem operatively connected to the second network and including a controller and at least one storage unit, the storage subsystem receiving and storing the data and verification information from the archive server, the verification information including the verification code and the verification method, the storage subsystem capable of generating a second verification code on the stored data at the storage subsystem using the verification method and comparing the verification code with the second verification code and sending one of a data verified signal and a data not verified signal to the archive server in response to receiving a request for verification from the archive server of the data stored at the storage subsystem, and wherein the storing the verification information and the data at the storage subsystem, the receiving the request for verification of the data stored at the storage subsystem, the generating the second verification code on the stored data at the storage subsystem, the comparing the verification code and the second verification code; and the sending the one of the data verified signal and the data not verified signal in response to the request are performed by microcode executing on the controller at the storage subsystem.

22. A system for archiving and validation of data comprising:

at least one server, each at least one server operatively connected to a first network and containing data to be archived;

an archive server, the archive server operatively connected to the first network and a second network, the archive server receiving the data from the at least one server and generating a verification code on the data using a verification method; and a storage subsystem, the storage subsystem operatively connected to the second network and including a controller and at least one storage unit, the storage subsystem receiving and storing the data and verification information from the archive server, the verification information including the verification code and the verification method, the storage subsystem capable of generating a second verification code on the stored data at the storage subsystem using the verification method and comparing the verification code with the second verification code and sending one of a data verified signal and a data not verified signal to the archive server in response to receiving a request for verification from the archive server of the data stored at the storage subsystem, and wherein the archive server generates an image of the data and generates the verification code on the image of the data using the verification method.

* * * * *